A. IRINYI.
HEATING DEVICE FOR LIQUID FUEL.
APPLICATION FILED OCT. 6, 1911.

1,148,515.

Patented Aug. 3, 1915.
3 SHEETS—SHEET 1.

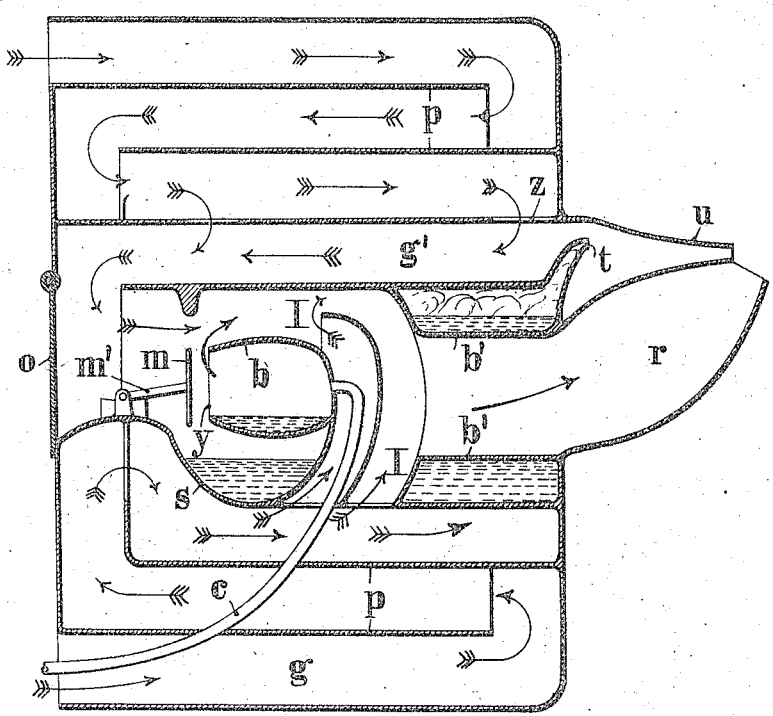

UNITED STATES PATENT OFFICE.

ARNOLD IRINYI, OF HAMBURG, GERMANY.

HEATING DEVICE FOR LIQUID FUEL.

1,148,515.  Specification of Letters Patent.  Patented Aug. 3, 1915.

Application filed October 6, 1911. Serial No. 653,274.

*To all whom it may concern:*

Be it known that I, ARNOLD IRINYI, a subject of the King of Hungary, residing at No. 2/4 Kleine Reichenstrasse, Hamburg, Germany, have invented new and useful Improvements in Heating Devices for Liquid Fuel, of which the following is a specification.

This invention relates to burners for liquid fuels, and the object of the invention is to provide such a burner which will completely vaporize and burn heavy oils without a continuously burning vaporizing heater, and will produce a flat fan-shaped flame.

Three constructions according to this invention are illustrated in the accompanying drawings in which—

Figure 1:
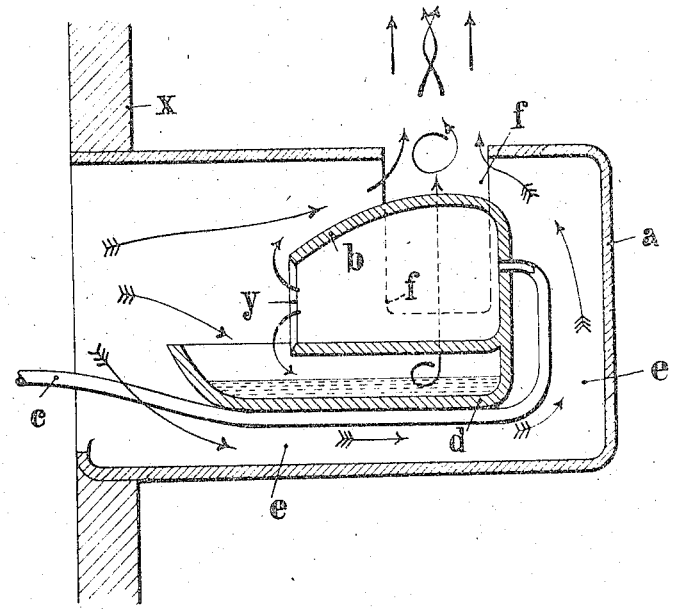
Figure 2:
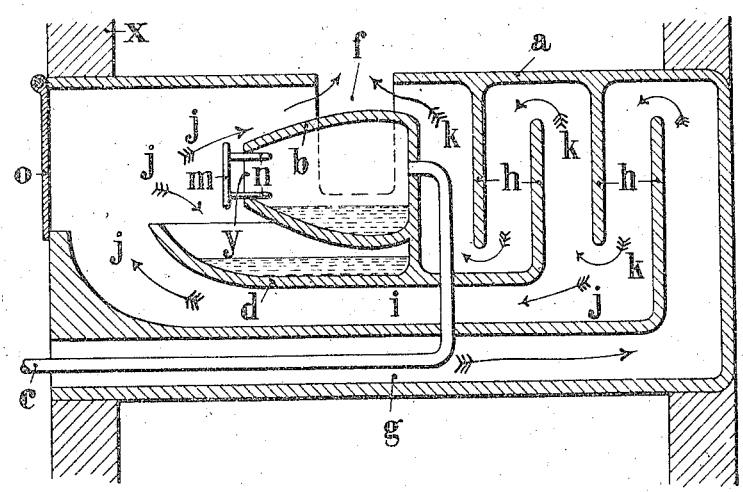
Figure 3:
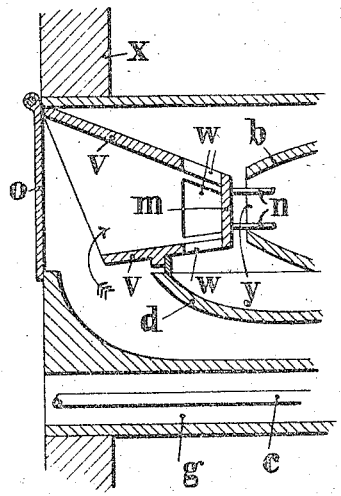

Figure 1 is a longitudinal section of one form of the invention, Fig. 2 a similar section of a second form, Fig. 3 a section of part of the burner shown in Fig. 2 showing a modification, and Fig. 4 is a longitudinal section of a third form of the invention.

The drawing shows several constructions according to this invention.

In the construction shown in longitudinal section in Fig. 1, $a$ is the casing of the heating device situated in the furnace $x$ and provided in the upper half with a slot $f$ extending over a portion of the circumference. Under the slot is arranged a retort-like vaporizing pan $b$ into which fuel is introduced through a pipe $c$. Below the pan is arranged the plate $d$ bent to form a cup and if desired made in one piece with the back wall of the pan. This plate has a two-fold purpose: During the starting it is used as a fuel tank but only until the pan is heated to such an extent that the fuel flowing through it is evaporated in the interior of the pan. When this degree of heat of the pan is reached, any further heating of the same becomes superfluous, as the heating will then be effected by the flame formed at the mouth $y$ of the pan. Another object of the plate $d$ is to produce in front and below the pan, the air path $e$, whereby air is supplied also to the rear portion of the flame. The path of the gases is shown in the drawing by single arrows, and the path of the air by feathered arrows. As the fuel supply pipe $c$ is carried through one of the air paths, in the drawing through the air path $e$, the fuel flowing through the pipe is cooled to such an extent that it arrives without modification in the pan situated in the hottest zone of the burner and heated from the outside by the flame as well as by the flame eddies produced by the air currents coming from the front and from the back. The pan opening or mouth $y$ is narrowed in front in proportion to the pressure of the fuel supplied, in order to prevent air from coming in, and consequently the flame from lighting back into the interior of the pan. In that way, the fuel is exposed in the pan to a complete and quick evaporation, (the more volatile components in evaporating dissipating the less volatile components in the form of spray), and consequent expansion. The escaping vapors are mixed with the above mentioned air currents flowing in opposite directions, and are carried in a burning state into the furnace chamber.

Fig. 2 shows a construction according to this invention in which air is admitted not through the furnace door, but through a separate pipe. Fuel is admitted into the pan $b$ through the pipe $c$. The combustion air is admitted through the pipe $g$ and is conveyed into the space behind the pan $b$. In that preliminary heating chamber, the path of the air is lengthened by means of partitions $h$ for the purpose of effecting a preliminary heating. The warm air is then guided, partly as primary air, in the direction of the arrows $j$ through the pipe $i$ into the chamber or space in front of the mouth opening of the retort, and partly in the direction of the arrows $k$ into the rear part of the flame formed at the slot $f$ of the casing. The pan is made at the bottom in the shape of a cup, so that fuel is always present there. In front of the pan opening is arranged wind protection plate $m$ introduced by means of feet $n$ into the mouth opening of the pan and arranged only at such a distance from the mouth opening that any lighting back of the flame or any breaking of the flame by the air current cannot take place. The diameter of the plate $m$ is somewhat larger than that of the pan opening, so that in the angle between the wall of the pan and the edge of the plate is formed a free flame and a constant ring of flame which constantly heats the pan. At the start, the tipping door $o$ is open, fuel introduced into the cup $d$ and lighted, whereby the pan is heated. After this is done, before the heating flame is extinguished, fuel is admitted into the pan $b$, and the tipping door closed, whereupon air enters through the pipe $g$ and arrives at the flame.

In the construction shown in Fig. 3, the door $o$ is connected with a conical funnel $y$ in one piece with the plate $m$. The funnel $y$ reduces the space in front of the retort and prevents the primary air from forming eddies, the said air escaping through openings $w$ with great speed close around the flame.

Another construction according to this invention is shown in Fig. 4, the chief feature of this construction being the arrangement behind the pan, of a second pan heated by its combustion gases, the object being to increase the draft of the flames. The fuel is supplied to the pans $b$ and $b'$ by means of pipes $c$ and $c'$. When the furnace door $o$ is closed the air is admitted into the air pipe $g$ and is strongly heated in the preliminary heater formed by the partition $p$. Into the space in front of the mouth opening $y$ of the pan $b$, the air is admitted through the pipe $g'$. The plate $m$ is arranged in front of the mouth opening $y$ of the pan $b$ in a pivotal manner, for instance on the pivoted arm $m'$. One portion of the heated air flows together with the flames out of the heater into the pipe $r$ guiding the flame, and thence into the heating chamber, so that in this case also secondary air is supplied to the flame, while the heated primary air flows directly to the opening $y$ of the pan. Under the retort is arranged a cup $s$ containing fuel in starting. Around the pipe $r$ is arranged the fuel tank $b'$ already referred to, the mouth opening $t$ of which opens into the nozzle $u$. This nozzle is connected at $z$ direct to the conduits guiding the heated air, so that on the nozzle being opened, a very hot flame is produced. The heat from the pipe $r$ evaporates the fuel contained in the pan $b'$ and thus increases the generation of heat to a great extent.

Claims:

1. A burner for heavy oils comprising in combination a casing having an air inlet, and a flame slot in a side remote from the air inlet, and a vaporizing chamber disposed within and spaced from the casing, having an outlet facing the air inlet and adapted to divide the air current from the said inlet into two currents which unite at the flame slot.

2. A burner for heavy oils comprising in combination a casing having an air inlet at one end and a flame slot in one side, and a vaporizing chamber disposed within the casing opposite the flame slot and spaced therefrom, said chamber having an outlet facing the air inlet and adapted to divide the air current from said inlet into two currents which unite at the flame slot.

3. A burner for heavy oils including in combination a casing having an air inlet and a flame slot in a side remote from the air inlet, and a vaporizing device arranged within and spaced from the casing and comprising a chamber, with an outlet facing the air inlet, and an oil retainer arranged below the chamber to receive oil for preliminarily heating the device, said vaporizing device being adapted to divide air entering the inlet of the casing into two currents which unite at the flame slot.

4. A burner for heavy oils including in combination a casing having an air inlet and a flame slot in a side remote from the air inlet, and a vaporizing device arranged within and spaced from the casing and comprising a chamber, with an outlet facing the air inlet, and an oil retainer arranged below and projecting beyond said chamber toward the air inlet and adapted to receive the oil for preliminarily heating the device, said vaporizing device being adapted to divide air entering the inlet of the casing into two currents which unite at the flame slot.

ARNOLD IRINYI.

Witnesses:
ROBERT BENZI,
JOHN J. ROUTE.